Patented Mar. 29, 1927.

1,622,496

UNITED STATES PATENT OFFICE.

GLENN DAVIDSON, HUGH F. RIPPEY, CHARLES N. CONE, IRVING F. LAUCKS, AND HARRY P. BANKS, OF SEATTLE, WASHINGTON, ASSIGNORS TO I. F. LAUCKS INC., OF SEATTLE, WASHINGTON, A CORPORATION OF WASHINGTON.

CELLULOSE-FIBER PRODUCT TREATED WITH A SIZE EMBODYING SOY-BEAN FLOUR AND PROCESS OF MAKING THE SAME.

No Drawing. Application filed May 3, 1926. Serial No. 106,543.

Our invention relates to a new article of manufacture, a cellulose fiber product treated with a size embodying soy bean flour, and to the process of making the same. More particularly, our invention relates to a cellulose fiber product such as paper and also cotton or linen fabrics provided with a new adhesive to form a size or coating therefor, which new adhesive has soy bean flour as the base thereof.

In general, there are known to the art: first, engine size, i. e., where the adhesive forms a coating for every fiber, which sizing is added to the paper during the process of its manufacture; second, surface size, which constitutes a coating for the surface to produce paper, especially fine surface paper, as for high grade writing stationary; and, third, surface coat, i. e., a mixture of adhesive and pigment for fine half-tones and book paper. Our product may be used for these various types of sizes, and also may be used in conjunction with talc, kaolin, whiting and the like to form coatings having a high gloss and water-resistant properties.

Furthermore, our invention may be used to impart to cellulose, cotton or linen fabrics the properties of stiffness and water resistance, as well as to increase their gloss or lustre, which use also includes stiffening in the place of starch in ordinary laundry operations.

The new material employed as the base for the size for our very much improved cellulose fiber product is soy bean flour. Wherever the term "soy bean flour" is used herein, it is used to include soy bean ground to a flour as a whole, soy bean from which a portion or all of the oil has been extracted by pressure or other means, as ground soy bean cake or meal, and also the extracted soy bean protein which is then ground to a flour-like condition. That is, the term "soy bean flour" as herein used includes the extracted soy bean protein, and the protein in conjunction with the other parts of the soy bean, as set forth in the analysis herein. We obtain soy bean flour by grinding the cake after the oil has been extracted by pressure or otherwise. The dried cake incident to the extracting of the oil is ground to pass, ordinarily, an eighty mesh screen, thereby providing the soy bean flour. We do not however, wish to restrict ourselves to this particular fineness, as for some purposes it is desirable to grind very much finer than this, and for other purposes it need not be ground so fine. The finer the texture of the material it is desired to produce, the greater is the degree of dispersion of the soy bean substance necessary, and consequently the finer must be the soy bean flour.

The flour thus prepared contains about: 10% moisture, 5% oil, which is the natural oil of the soy bean, 45% proteins, 15% carbohydrates, in the form of sugars and starches, 5% mineral matter or ash, 5% cellulose, 15% so-called hemicelluloses, of which very little is known as far as their exact composition is concerned. They are probably very similar to pectin. It will be noted, therefore, that the chief component of soy bean flour is the protein. A considerable proportion of this protein is soluble in water, or at least disperses in water readily in the presence of the other natural components of soy bean flour. Also, a considerable proportion of the other components is soluble in water. While the valuable properties of the flour, we believe, are due largely to the protein content, we feel also that the other components modify the action of the protein to a very considerably extent, and may even be responsible for much of the valuable effect that soy bean has. While it is true that a considerable proportion of the soy bean flour is water soluble or soluble in alkaline solutions, it is rendered insoluble by the customary paper mill treatment of size, such as acidification and action of formalin and heat. In other words, while soluble, the soy bean base herein employed for the size is no less efficient in its operation as a size than ordinary size at present in use. It is to be understood that the size must be precipitated and be insoluble when in position as a size or coating on the cellulose fiber product.

Heretofore, various adhesives for sizes and coatings on cellulose materials, such as paper and textiles, have been used, such as casein, animal glue, starch, dextrin, rosin and the like. All of these materials, however, are relatively high priced and we have found in the soy bean not only an adhesive at least of equal value to the materials just named, but one having improved qualities and at the same time being very much more economical.

In general, before the desired adhesive effect of the soy bean flour is realized, it must be dispersed in aqueous media. Dispersion may either be by mechanical means, or it may be aided by various chemicals in solution in water. For example, dispersion may be effected by treatment in a so-called colloid mill, which reduces the particles to dimensions which fall within the limits of the colloid state of matter. If less mechanical work is done upon it, aid must be given by chemical means. There are a number of chemicals which aid in the dispersion. Of all these, caustic soda is perhaps the cheapest and most effective in dispersing. Other weaker alkaline salts, such as sodium borate, sodium phosphate, sodium sulphite, sodium carbonate, etc., may be used, or combinations of sodium salts with lime, such combinations producing caustic soda when wet, may also be used. Other compounds also have dispersing effects on soy bean flour as, for example, copper and mercury salts. Rosin, in the presence of alkalies, we have found to have very considerable dispersing effect as have also various phenols, sulphurous and phosphoric acids. We use the word "dispersing" as being the accepted term among colloid chemists to denominate the effect produced, although we do not wish to bind ourselves to any particular interpretation of the word. The effect produced is a transformation of a mealy mass when wet to a more or less smooth mass. It is generally believed that this change is due to a change in the size of the particles or aggregations of particles.

The choice of the means of dispersion depends on the use to which the article is to be put. For example if the size is to be used as an engine size, then it is manifest that the mixing process of the size with the paper fiber supplies violent mechanical agitation, which in and of itself operates to disperse the soy bean protein element of the flour. However, if a manufactured sheet of paper or cloth is to be dipped in the size, pressed and dried to supply a coating or surface sizing, then it is necessary that the dispersion be more complete because there would be little or no mechanical agitation accompanying the dipping process, and also the degree of mechanical agitation, as opposed to the use of strong alkalies, will depend in part upon the particular use to which the sizing is to be put. Strong alkalies for obvious reasons could not be used in sizing very delicate textiles, fabrics and papers. The choice will then fall upon the mechanical dispersion or the weaker alkali salts, or even the neutral or weak acid agents. Ammonia may be used where the effect of an alkaline hydrate is desired, in sizing delicate fabrics, when it is not practical to use caustic soda or potash. Caustic lime also has a certain dispersing tendency.

As herein indicated, water has a considerable dispersing effect, and a considerable proportion of the protein is dispersed or put in solution by the use of water, the amount of protein so dispersed or dissolved depending, we find, largely upon the character of the pre-treatment which the flour has had. Where only a weak dispersion is necessary, admixing with water only is sufficient.

We claim as dispersing agents any compound or any chemical or means of dispersing soy bean flour which renders the soy bean flour in the desired colloidal state for use.

The use of the product which constitutes our invention in no wise requires any different mill practice than obtains at present, i. e., our invention is one which utilizes present mill practice to provide various effects which are obtained by calendering, such as a high or dull gloss which may be imparted to the article by the extent of the calendering as obtains with the sizing of present day practice. Likewise, as indicated above, the sizing may be mixed with the cellulose as in "engine-mixed" sizes in paper making, or the size may be first mixed with water in a vat, and the fabric dipped therein, or run through it continuously. Ordinarily, the latter would be the preferred method in sizing fabrics such as cotton or linen cloth or in coating paper.

An especial advantage obtains in the use of a size embodying our invention when oils or asphalt are mixed with the aqueous dispersion of the adhesive to render the product more pliable. The soy bean flour has a very powerful emulsifying effect on both mineral and fatty oils, and oil to a considerable percentage may be readily incorporated in an aqueous dispersion of the flour. This would seem to result from the fact that the soy bean originally contained a considerable amount of oils, which are extracted in the process of making the flour. Therefore, when oils are added, the flour is merely re-absorbing substances similar to those which have been previously extracted. Hence, the coatings which result from applying a size having the soy bean as a base impart a very pliable character to the product. This is a most distinct advantage inhering in our cellulose fiber product.

If a particularly water resistant coating is desired, the treated fabric, after being impregnated with a dispersion of soy bean flour, or after the cellulose has adsorbed the colloids of such a dispersion, may be passed through a bath containing formaldehyde in dilute aqueous solution, picric acid, or tannic acid. These affect the soy bean colloids and render them more insoluble in water.

After fabrics have been thus treated, they are passed between rolls to remove excess water, and then dried.

Heat we have found may also be employed to render the treated fabrics more water-resistant. Heat acts, it seems, to set the soy bean colloids and make them more insoluble. The heat may be applied by hot rolls, hot presses, or in an oven.

The following examples of treatment will more definitely set forth our invention:

1. One part soy bean flour is kneaded with two parts water in the form of a dough. A considerable amount of mechanical work is expended in this stage. It is then diluted with five to ten parts water, and the relatively thin liquid thus made forms the size. This may be stirred with cellulose fiber, and the excess water removed as in paper making. Or a sheet of paper or cloth may be dipped in the size, the excess removed, and then dried.

This makes a fabric, either paper or cloth, that repels wetting with water, and has increased strength. By passing through hot rolls a high gloss may be obtained. This may also be used as a laundry starch. Passing a hot iron over the cloth wet with the size gives the cloth a high degree of stiffness and gloss, similar to the well-known laundering process using starch.

2. One percent sodium sulphite, or sodium acid sulphite, on the basis of the weight of soy bean flour, is added. Less mechanical work is necessary in this case. The method of use is similar to that of the first example given.

3. One percent sodium chloride, on the basis of the weight of soy bean flour, is added. After manipulation, the method of use is practically the same as that of Example 1.

4. One percent alum on the basis of the weight of the soy bean flour is added. This makes a lighter colored size. A piece of paper, sized with this combination and dried, can be immersed in water, the water wrung or squeezed out, and upon re-drying has practically the same properties as it had before wetting.

5. A mixture of soy bean flour, with one percent alum, and diluted with ten parts of water, was allowed to stand for several days, whereupon fermentation commenced. This mixture, partly fermented, was then used as a size.

6. Ten parts soy bean flour, one part sodium fluoride, seventy-five parts china clay or kaolin, one hundred twenty parts water, were stirred to a homogeneous thick liquid. Paper was then dipped into this, the excess removed, and dried by pressing with a hot iron. A smooth glossy white coat resulted. This mixture would be used for coating paper where it was desired to obtain a very smooth surface, as, for example, in books or magazine papers.

All of the above sizes or coatings, as the case may be, either on paper or cloth were water repellent. A drop of water will stand for a considerable time without penetrating the fiber. Either paper or cloth, after sizing with the above, can be written on with ink without the ink spreading. The sizes impart a smooth feeling both to paper and cloth. The degree of gloss or lustre can be varied in accordance with well recognized mill practice.

7. A particularly good size may be made of soy bean flour as follows: 800 parts soy bean flour, 120 parts hydrated lime, 180 parts rosin, 16 parts permanganate of potash, 60 parts sodium fluoride, 80 parts sodium carbonate, 16 parts copper sulphate, dispersed by stirring with 900 parts water. This forms a strong adhesive and may be used as a size.

When 180 parts of this wet adhesive are emulsified with 20 parts China wood oil, and then applied to a cloth and dried, a flexible, waterproof coating or size is the result, depending upon how much is applied. Such coating can be used on coarse fabrics such as burlap or canvas, and fills the pores or meshes in the fabric. By varying the amount of oil, greater or less degrees of flexibility can be secured.

8. 15 parts soy bean flour, 10 parts strong aqua ammonia, 75 parts water, mixed together and digested for 30 minutes in a closed container, at 100° C. We have found, when paper was dipped into this size, and the excess squeezed out and dried, that the dried sheets were water-resistant.

The above examples merely illustrate a few of the many ways in which soy bean flour can be used to secure the desired results. We do not confine ourselves to these particular formulæ.

We claim:

1. A cellulose fiber product treated with a size embodying soy bean flour.

2. A cellulose fiber product treated with a size embodying dispersed soy bean protein as a base for said size.

3. A cellulose fiber product treated with a size embodying a soy bean protein as a base, said protein being dispersed by caustic soda.

4. The process of making a cellulose fiber product of treating the product with a size having soy bean flour as a base, and passing the product through a bath containing formaldehyde in dilute aqueous solution, picric or tannic acid.

5. The process of making a cellulose fiber product of treating the product with a size having soy bean flour as a base, passing the product through a bath containing formaldehyde in dilute aqueous solution, picric or tannic acid, removing the excess water by passing the product through rolls, and applying heat to the product.

In witness whereof, we hereunto subscribe our names this 24th day of April, 1926.

GLENN DAVIDSON.
HUGH F. RIPPEY.
CHARLES N. CONE.
IRVING F. LAUCKS.
HARRY P. BANKS.

DISCLAIMER 1,622,496.—*Glenn Davidson, Hugh F. Rippey, Charles N. Cone, Irving F. Laucks,* and *Harry P. Banks,* Seattle, Wash. CELLULOSE-FIBER PRODUCTS TREATED WITH A SIZE EMBODYING SOY-BEAN FLOUR AND PROCESS OF MAKING THE SAME. Patent dated March 29, 1927. Disclaimer filed August 27, 1937, by the assignee, *I. F. Laucks, Inc.*

Hereby enters this disclaimer to that part of the said specification as is herein below specifically set forth, and to the claims hereinafter specifically set forth, and to any interpretation of the specification or claims which possibly might be interpreted to include any of such disclaimed matter:

Page 1, lines 41–43, cancel the following: ", and also the extracted soy bean protein which is then ground to a flour-like condition".

Page 1, line 44, cancel "extracted".
Page 1, line 45, cancel ", and the protein".
Cancel claims 2 and 3.

Disclaims any interpretation or construction of the specification or claims of the said patent which brings within the scope or import of the specification or claims of said patent *chemically isolated or chemically extracted vegetable protein.*

[*Official Gazette September 21, 1937.*]